United States Patent
Bond et al.

[11] Patent Number: 5,181,177
[45] Date of Patent: Jan. 19, 1993

[54] METHOD AND APPARATUS FOR NON-CONTACT MACHINING WITH DYNAMIC FEEDBACK CONTROL

[75] Inventors: Robert D. Bond, Northville; Thomas E. Denham, Plymouth, both of Mich.

[73] Assignee: Raycon Corporation, Ann Arbor, Mich.

[21] Appl. No.: 773,240

[22] Filed: Oct. 9, 1991

Related U.S. Application Data

[63] Continuation of Ser. No. 365,747, Jun. 13, 1989, abandoned.

[51] Int. Cl.$^5$ .............................................. B23H 1/02
[52] U.S. Cl. .......................... 364/474.04; 364/474.15; 219/69.17
[58] Field of Search ...................... 364/474.04, 474.14, 364/182, 474.08, 474.15, 474.37, 551.02; 219/69.17

[56] References Cited

U.S. PATENT DOCUMENTS 3,634,664  1/1972  Valek ............................ 364/474.15
4,335,436  6/1982  Inoue ............................. 364/474.04
4,725,705  2/1988  Holland-Moritz et al. .... 364/474.04

Primary Examiner—Jerry Smith
Assistant Examiner—Patrick D. Muir
Attorney, Agent, or Firm—Reising, Ethington, Barnard, Perry & Milton

[57] ABSTRACT

Non-contact machining of workpieces on a mass production basis is accomplished with dynamic and adaptive feedback control to achieve accurate machining of a first and second feature to a specified combined size. The first feature is machined in the workpiece and measured to obtain a value which represents the size. A proces parameter is adjusted in accordance with the measurement value based on a stored transfer function so that the second feature will be machined with an extrapolated size such that the combined size will be within the acceptability limit. Additionally, the combined measurement values of successive workpieces is analyzed to determine the trend of change of the values with respect to the specified size and the parameter is adjusted to machine the first feature and the combined features more accurately.

17 Claims, 6 Drawing Sheets

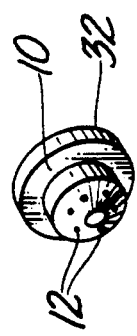
Fig. 1
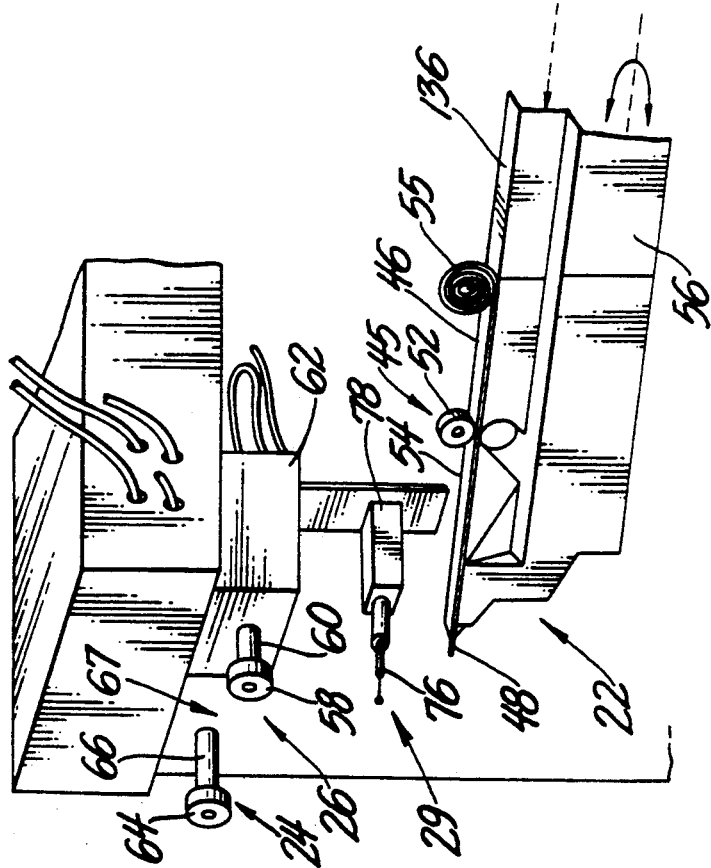
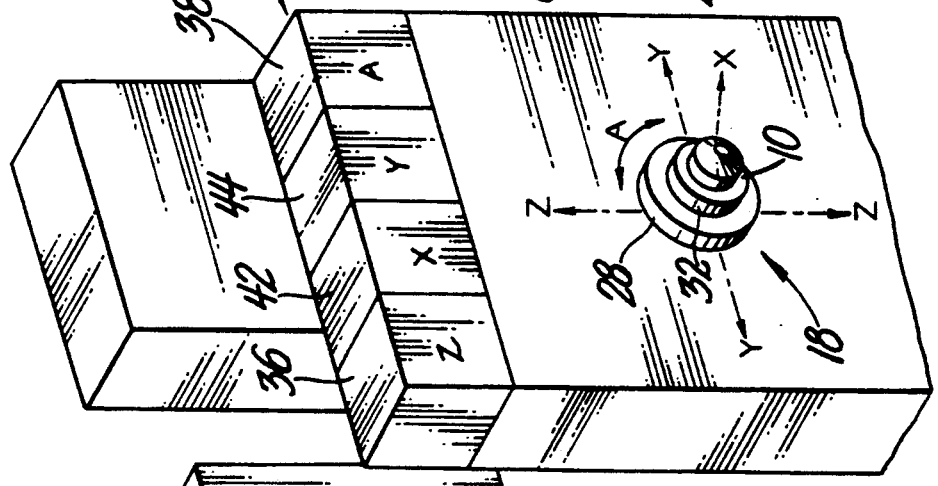
Fig. 2

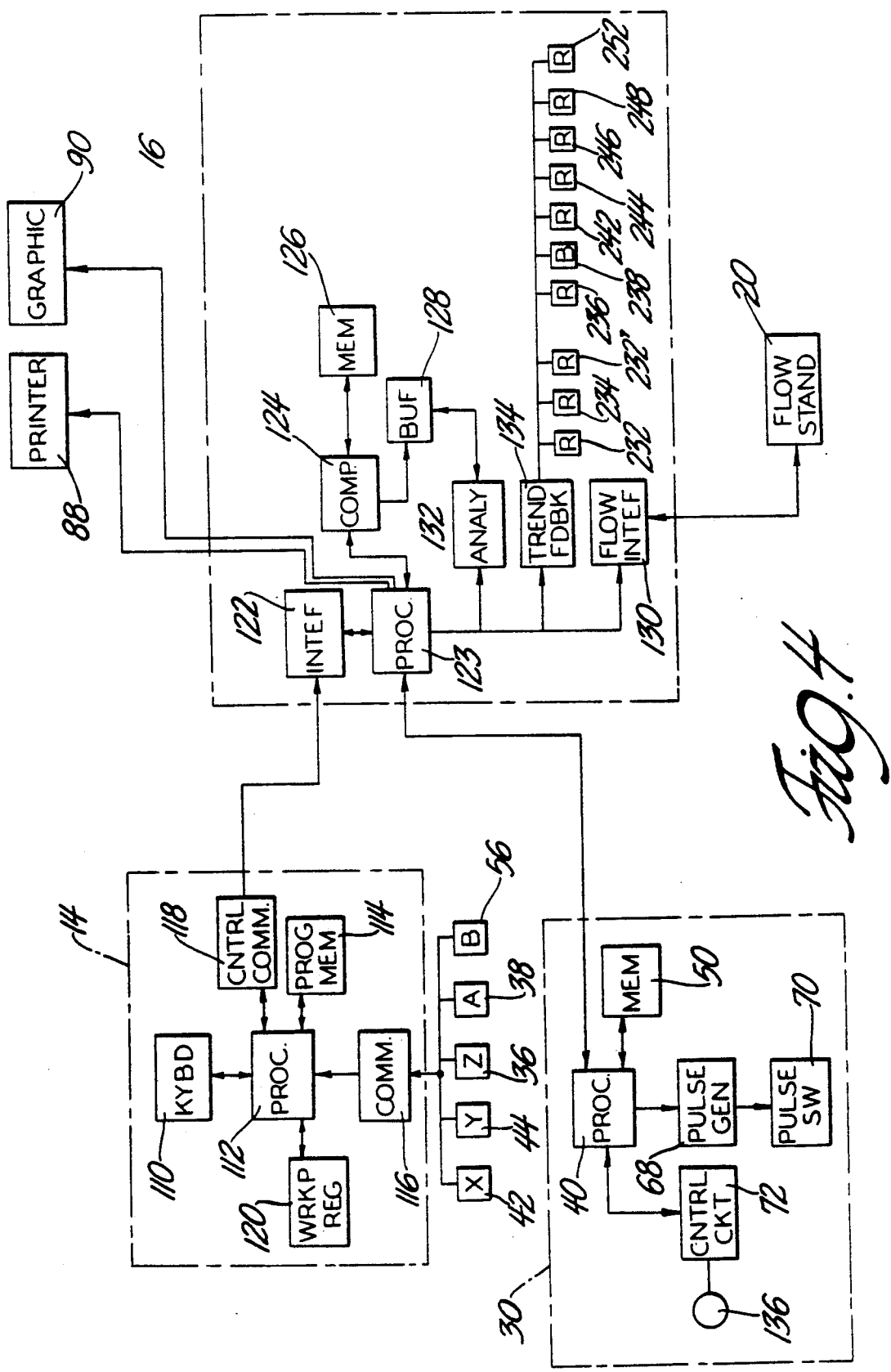

METHOD AND APPARATUS FOR NON-CONTACT MACHINING WITH DYNAMIC FEEDBACK CONTROL

This is a continuation of application Ser. No. 365,747, filed on Jun. 13, 1989 and now abandoned.

TECHNICAL FIELD

This invention relates to non-contact machining, and more particularly, it relates to a method and apparatus for machining multiple parts or workpieces with substantially uniform accuracy.

BACKGROUND OF THE INVENTION

In many applications, non-contact machining is used for the mass production of parts which must be machined to close tolerances. There are several factors which effect the repeatability of accuracy of machining by the non-contact process. Non-contact machining commonly includes the use of electric discharge EDM, lasers, or electron beam. In the EDM process, factors which effect the repeatability of accuracy include the process parameters of electrode size, spark energy, spark current, gap length and gap voltage. For example, when the EDM process is used to machine a small hole through a thin plate, the variation in diameter of the wire electrode over a large number of parts may result in many parts being out of tolerance unless special measures are taken. Also, mechanical wear in the fixturing system will result in variation in hole diameters. Even though such variations may be on the order of one ten thousandths inch, they nevertheless adversely effect the accuracy of the finished part. In the case of an orifice plate for fuel injectors, for example, the specified tolerance is 1% but the electrode wire commercially available has a tolerance of two percent. Thus, the desired accuracy can not be achieved uniformly by conventional practice.

Accordingly, there is a need for obtaining improved uniformity and accuracy by the non-contact process. Further, it should be achieved by depending upon stringent control of the various parameters to precisely constant values. Instead, as a practical matter, the improved accuracy must be achieved while tolerating variations with time in certain operating parameters of the EDM process.

U.S. Pat. No. 4,725,705, issued Feb. 16, 1988 with a common assignee, discloses a method and apparatus for electric discharge machining with adaptive feedback for dimensional control. Such method and apparatus, while suitable for their intended purpose, can be applied to other non-contact machining systems in which a parameter can be adapted to control erosion of a single feature. Furthermore, the '705 patent discloses machining a plurality of workpieces, measuring the hole size, and monitoring the trend of change of the measured flow and adjusting the spark energy based on that trend. However, use of the adjustment after a plurality of parts or even a single part, does not consistently maintain the hole size with the low acceptability limit of 1%.

SUMMARY OF THE INVENTION AND ADVANTAGES

The invention includes a method of non-contact machining of the workpiece to provide a feature thereof with a specified size within predetermined tolerances, the feature being divisible such that each portion may be machined independently of the others, the machining being of the type wherein the workpiece is eroded by an intermittent discharge and eroding being determined by plural parameters at least one of which is adjustable. The method includes steps of machining a workpiece to form a portion of the feature, the feature having a size which varies with an adjustable parameter, measuring the portion of the feature machined on the workpiece to obtain a measurement value which represents the feature, analyzing the measurement value of the machined portion of the feature to determine the theoretical size of the remaining feature necessary to be machined so that the size of the feature is within a predetermined tolerance, adjusting an adjustable parameter to machine the remainder of the feature to the theoretical size, and machining the workpiece to form the remainder of the features of the workpiece.

Further included is an assembly for non-contact machining to provide a plurality of features with a specified combined size in a workpiece. The assembly comprises machining means for machining first and second features on a workpiece, the features having a size which varies with an adjustable parameter; measurement means for measuring the size of the first feature and the combined size of the first and second features on the workpiece and producing a first measurement signal and combined measurement signal, respectively; and controller means for receiving and analyzing the first measurement signal and for producing the adjustable parameter for machining the second feature by analyzing the first measurement signal to determine an extrapolated size of the second feature necessary to be machined so that the combined size of the first and second features is within a predetermined tolerance.

The advantages of the invention include maintaining the size of the feature to within small tolerances or acceptability limits by utilizing dynamic feedback and adjustment o the adjustable parameter before completing the workpiece. Furthermore, the blank workpieces are not manufactured to extremely close tolerances, therefore, the invention compensates for variations in individual workpieces.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an example workpiece;

FIG. 2 is a perspective view of the tooling;

FIG. 4 is a more specific block diagram of the subject invention;

DESCRIPTION OF THE PREFERRED EMBODIMENT

Figure 3:
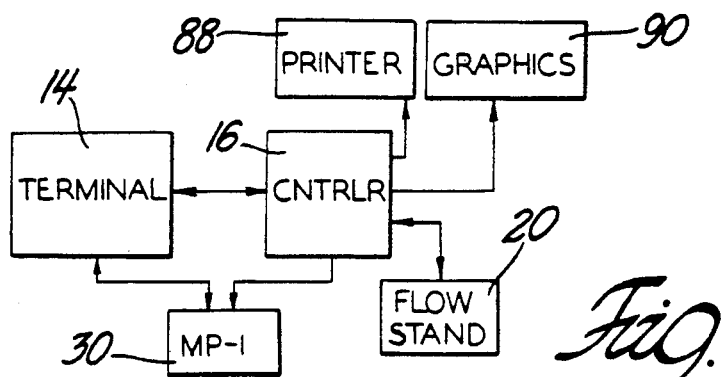
FIG. 3 is a block diagram of the preferred embodiment of the invention.

Referring to the drawings, there is shown an illustrative embodiment of the invention in a method and apparatus for non-contact machining using an adaptive control system which adjusts a selected parameter in response to a feedback signal representing workpiece measurement data. A hole or set of holes in the workpiece is the preferred feature and, by way of example, is to be machined to a specified flow within 1%, measured by its fluid flow capacity. It will be appreciated as the description proceeds that the invention may be embodied in may different forms and utilized for many different applications.

The non-contact machining may be accomplished by various types of devices, such as an electric discharge machine (EDM), lasers, electron beam, and the like. The adjustable parameter of EDM is spark energy, commonly referred to as overcut.

In the illustrative embodiment of the invention to be described, a non-contact machining method and apparatus is utilized for machining a set of small holes in the head of a diesel fuel injector tip as illustrated in FIG. 1. It should be understood that various types of workpieces may be machined by the subject apparatus and method, and the invention is not limited to diesel fuel injector tips. Such workpieces or parts are manufactured in high volume using mass production techniques and must be held to very close dimensional tolerances. As shown in FIG. 1, the workpiece or part comprises a circular fuel injector tip 10 with a set of six small holes 12, commonly between five and twelve holes, in a circular array surrounding the center of the conical head of the tip 10. In the example workpiece, each of the holes have a specified diameter of six thousandths of an inch with a tolerance of plus or minus one ten thousandths of an inch. The set of holes of such size, taking collectively, has a certain fluid flow capacity. Measured flow capacity is used as an index of size. The size or measured flow must be within 1% of the specified size.

In the preferred embodiment of the subject invention as illustrated in the Figures, electric discharge machining is utilized. However, the EDM may be simply replaced by a laser or such having an adjustable parameter of energy.

As generally illustrated in FIG. 3, the invention comprises terminal means 14 for selecting a workpiece identifier and producing a movement program, controller means 16 for receiving the workpiece identifier and controlling the spark energy based on a flow measurement value through a first set of holes, measuring means 20 for measuring the absolute flow through the holes 12 of the workpiece 10 and machining means 30 for machining or drilling the holes 12 based upon the adjusted overcut from the controller means 16. The machining means 30 comprises an electric discharge machine (EDM). The movement of the workpiece between stations is controlled by the movement program of the terminal means 14 and the spark energy of the EDM is determined by the controller means 16.

The tooling of the subject invention is shown diagrammatically at 100 in FIG. 2. In general, the tooling 100 moves the workpiece between an access station 18, offset station 29, a machining station 22, a blow-off station 26, and a test station 24 for the measuring means 20. A workpiece spindle 28 is adapted to move the workpiece through these successive work stations 18, 22, 24, 26, 29.

The tooling 100 includes the spindle 28 supporting a collar 32 for receiving the workpiece 10. The spindle 28 is connected to a servo system 34 which controls the movement of the spindle 28 in order to move the workpiece 10 between stations 18, 22, 24, 26, 29. The servo system 34 includes a first motor control 36 for controlling movement of the spindle 28 along the Z or vertical axis, a spin motor control 38 for rotating the workpiece 10 to allow all holes 12 to be drilled as indicated by arrow A, an X axis motor control 42 for moving the spindle 28 along the X axis, and a Y axis motor control 44 for moving the spindle 28 along the Y axis. The motor controls 36, 38, 42, 44 are controlled by the terminal means 14, as described subsequently. The motor controllers 36, 38, 42, 44 allow the workpiece to be moved between the various stations 18, 22, 24, 26, 29.

The access station 18 is a neutral position of the spindle 28 which allows a workpiece 10 to be inserted and removed from the collar 32. Once the operator inserts a workpiece and starts the program, the spindle 28 moves the workpiece 10 to the offset station.

The offset station 29 measures the offset of the workpiece and collar 32 from a central or ideal position and produces an offset signal to the terminal means which compensates for actual positioning with respect to the remaining stations 18, 22, 24, 26. The offset station 29 includes an electrical probe 76 mounted on a vertical support column 78. The X axis motor control 42 moves the workpiece into contact with the probe 76.

The machining station 22 comprises the electric discharge machine (EDM). The electric discharge machine comprises a head 45 having a carriage 46 for feeding a wire electrode 48 for machining the holes in the workpiece at the machining station 22 on the collar 32. The head 45 may be a laser or electron beam. The wire electrode 48 passes through a refeed mechanism 52 and a wire guide 54 to the workpiece. The refeed mechanism 52 is adapted to advance the electrode wire, which is supplied from a spool 55, relative to the carriage 46 upon retraction of the carriage 46 after each machining operation. The holes 12 are machined in a first and second set, more specifically, the first machining of the workpiece 10 is indexed to drill every other hole 12 comprising a first set of holes, and a latter machining drills the remaining holes 12 or second set of holes. After each machining operation to form one of the holes 12 in the first set, the completed movement of the carriage 46 causes the spindle 28 and collar 32 to be indexed to place the next hole location at the machining station 22. Then the spindle 28 is indexed to the position for machining the last hole of the first portion in the workpiece. Upon completion of the machining of the last hole of a portion in the workpiece, terminal means 14 moves the spindle 28 to transfer the collar 32 and workpiece 10 from the machining station 22 to the blow-off station 26.

The EDM head 45 is connected to a servo controller 56 which moves to angle the carriage 46 between positions parallel and directly pointing toward the center of the workpiece tip and perpendicular to the center axis X of the workpiece along arrow B. In other words, the carriage 46 may move to positions between parallel to the probe 76 and perpendicular thereto. Different fuel injector tips may have different slopes at their heads, which must be compensated for by the servo controller 56 so that the holes 12 are drilled perpendicular to the conical surface of the workpiece 10. The servo controller 56 is controlled by the terminal means 14.

The blow-off station 26 is located above the EDM machine and comprises a connection head 58 for receiving the workpiece 10 and collar 32 in sealing engagement therewith, a pneumatic cylinder 60 connected to the connection head 58 for moving the head 58 into contact and away from the workpiece 10, and a self-contained blow-off stand 62 connected to the workpiece through the head 58 and pneumatic cylinder 60. The blow-off stand 62 functions to blow air through the workpiece 10 in order to remove any water, oil or other residue from the machining operation. Water is generally utilized during machining and oil is utilized during measuring, therefore residue may remain on the workpiece between the two operations. The X-axis motor 42 moves the workpiece toward the head 58 to a position within the stroke of cylinder 60. The Y and Z axis motors 36, 44 move the workpiece to a position centered horizontally from the head 58.

The test station 24 includes a connection head 64 for receiving the workpiece in sealing engagement therewith and a moveable cylinder 66 for moving the connection head 64 in connection with and away from the workpiece 10. The cylinder 66 is connected to flow stand valve box 67 connected to the measuring means 20 which measures the absolute flow rate of the workpiece 10. After the test operation is completed on the first portion of holes 12, the spindle 28 is moved from the test station 24 to the blow station 26 to remove oil, and then to the machining station 22, which is operated in the manner as described above for the first set of holes. Upon completion of machining the last hole in the workpiece 10 the spindle 28 transfers the workpiece 10 from the machining station 22 to the blow station 26 and then to the test station 24, as previously discussed with the first set of holes.

After the test operation is completed on the second set of holes 12, the workpiece 10 is transferred from the test station 24 to the access station 18 for removal of the part by an operator and sorting thereby dependent upon the displayed measurement, as hereinafter discussed.

The electronic control system for the EDM described above is shown generally in FIG. 3 and more specifically in FIG. 4. The electric discharge machine is generally described in U.S. Pat. No. 4,725,704, except that the machine is herein utilized as a peripheral device only for machining the workpiece.

The machining means 30 includes processor means 40 for controlling the EDM parameters necessary for machining of the workpiece. Also included is memory means 50 for the storage of data and access by the processor 40. The processor means 40 is generally a microprocessor and the memory means 50 is random access memory (RAM). The machining means 30 includes a pulse generator 68 controlled by the microprocessor 40 for supplying the required electrical pulses for the EDM process. The output of the pulse generator 68 is applied to a pulse switching and conditioning circuit 70 which supplies the power to the gap between the electrode 48 and the workpiece 10 for machining of the workpiece. A servo system moves the carriage 46 for controlled feed and retraction of the electrode 48 in the machining operation. The servo system comprises an EDM servo motor control circuit 72 which operates under the control of the microprocessor 40 to control the energization of the servo motor 136 which is coupled with the carriage 46 to move the carriage 46 toward and away from the workpiece 10 along the C axis. The processor means 40 receives the adjustable parameter and EDM parameters from the controller means 16 and stores them in memory 50. The adjustable parameter may be updated after each machining operation, as subsequently described, and is used to machine the holes in the workpiece in accordance therewith.

The terminal means 14 receives the workpiece identifier and retrieves a movement program for controlling the machine motion. The terminal means 14 is a computer terminal, Allen-Bradley No. 8400, having input keyboard 110, processor 112, program memory 114 and communication link 116 connected to the servo controllers 36, 38, 42, 44, 56, and controller communication 118 to communicate with the controller means 16. The processor 112 receives from the keyboard 110 the part number or workpiece identifier and stores it in a workpiece register 120. The memory 114 has stored therein a listing of part numbers and associated movement programs for controlling the servo controllers 36, 38, 42, 44, 56. The processor 112 compares the inputted part number to the numbers in memory 114 and upon a match, points to the associated movement program in the memory 114 for concurrent execution. Upon execution, the processor 112 utilizes the movement program in memory 114 and controls the movement of the spindle 28 and EDM servo control 56 through communication link 116. The processor 112 receives an input from the workpiece probe 76 indicating proper orientation and positioning of the workpiece, and adjusts any subsequent movement and centering in response thereto. Each part number may have a different movement program for machining the workpieces which is determined and controlled by the terminal means 14.

The measuring means 20 is responsive to the controller means 16 for measuring the size of the feature or holes of the workpiece thereby producing a measurement signal indicating the flow rate value. The measurement means 20 measures the absolute flow through the features of the workpiece. The measurement means 20 is a flow stand 67 by Labeco of Mooresville, Ill. No. 8112. The flow stand 20 flows oil and determines the flow rate therethrough in pounds per hour, however, other mediums may be used. The flow stand 20 forward flushes the workpiece, reverse flushes the workpiece, and then continuously flows the workpiece to obtain a stabilized flow rate value. The flow stand 20 produces the measurement signal representative of the flow rate through the workpiece which is indicative of hole size.

The controller means 16 receives the workpiece identifier and produces EDM variables for the specific workpiece for the machining and adjusts the adjustable variable after the measurement of the first set of drilled holes in accordance with a transfer function to be described. Adjustment of the adjustable parameter ensures that the total flow of the feature is within the predetermined tolerance of 1% from the specified flow. The controller means 16 is a host computer or cell controller comprising a computer by PROLOG.

The controller means 16 includes terminal interface means 122 interfacing with the terminal means 14 to receive the workpiece identifier. A processor 123 controls the sequences of operation of the terminal means 14, measuring means 20, and EDM processor means 40. Also included is a printer 88 and graphics display monitor 90 for printing and displaying EDM parameters and flow measurements. A comparator means 124 utilizes the workpiece identifier and compares the identifier to memory 126 which stores the part number, transfer function and EDM variables, including the starting adjustable parameter for each workpiece identifier. The comparator 124 obtains the transfer function and variables for the specific workpiece identifier and stores the transfer function into transfer function buffer 128 and transmits the EDM parameters to the processor means 40 of the machining means 30. The interface means 122 receives the position signals from the terminal means 14 which indicates that the workpiece 10 is in position at the proper station 18, 29, 22, 24, 26, and transmits signals to the terminal means 14 to initiate movement of the tooling and machining the holes. The controller means 16 includes flow interface means 130 for producing a flow signal to the measurement means to initiate flow testing, and receiving a signal of the measurement value of the size of the feature. The value is the size of the first set of the features drilled or the size of the whole of the features or holes drilled.

In order to control the EDM process to achieve the desired workpiece hole size, feedback information is developed in the form of absolute flow value as a measure of hole size. The EDM spark energy is utilized as the adjustable parameter for controlling hole size in accordance with the feedback information. There are many factors that influence hole size in the EDM process, some of which can not be controlled in the EDM process, such as electrode dimensions. These factors add a random variation to the feedback signal. In order to stabilize the process, the random variation must be stabilized or the individual random variations must be ignored. In the illustrative embodiment, two feedback schemes are utilized. The first is taking the flow value of a portion of the holes machined, adjusting the overcut, and machining the remaining holes. In the second, the individual random variations are ignored by taking the average of the relative flow values for a group of n workpieces in succession. By comparing successive group averages, feedback information indicative of the trend of change is obtained.

In the first feedback scheme, the measurement value of the first set of the features is received, and the measurement is sent to analyzer means 132. The analyzer means 132 compares the measurement value with the transfer function to determine if a new overcut or spark energy value is necessary to insure that the whole of the feature or workpiece will be within the predetermined tolerances. If a new overcut value is necessary, the new overcut value is transmitted to the machining means 30 establishing the dynamic feedback. The transfer function of each part number is determined using the following procedure. To obtain the transfer function, the operator sets the overcut, drills half the holes, measures the flow and drills the remaining holes at the same overcut and measures the total flow. These measurements are graphed. In the preferred example, a first set of holes should have a flow rate of 150 lbs/hour while the whole of the workpiece should have a flow rate of 300 lbs/hour. However, the curve is not linear. Therefore, during machining if a first measured flow is greater than 150 lbs/hour, if the same overcut is used, the 300 lbs/hour will be exceeded. Therefore, the transfer function is used to estimate the decreased overcut necessary to ensure a flow of 300 lbs/hour.

In order to develop a trend feedback for adaptive control of the EDM process, upper and lower adaptive control limits are established for the absolute flow value of the workpiece. If the average of the relative flow value for the last group is below the upper adaptive control limit and above the lower adaptive control limit, no correction of the process is called for and the parameter, i.e., spark energy, is not changed. On the other hand, if the average is above the upper adaptive control limit or below the lower adaptive control limit, need for change of spark energy is indicated. Preferably, another criteria is utilized for making a decision whether to adjust the spark energy. This additional criteria is a value of the average for the last group relative to the average to the next to last group. In particular, if the average absolute flow for the last group is higher than the upper adaptive control limit and if it is not less than the average for the next to last group, the spark energy is decreased. If, on the other hand, the average for the last group is less than the adaptive control lower limit and is not greater than the average to the next to last group, the spark energy is increased. When a change in spark energy is called for, the change is made in gradual increments, an increment at a time, as will be described presently.

In the second feedback scheme, the controller means 16 includes trend feedback means 134 for storing the combined measurement value of a plurality of successive workpieces and monitoring the change in trend of the workpieces, and adjusting the overcut or adjustable variable for the first set of holes to be machined to correct the trend in order to form the workpieces to be within the acceptability limit. In the case that the measurement value is for the whole of the feature, the measured value is compared to an acceptability limit at which point, if the value is greater than the acceptability limit, the controller means 16 transmits the reject signal to the printer 88 and display terminal 90 indicating such is not within limits, alternatively, if the measurement value is within the acceptability limit, the controller means 16 transmits the accept signal to the printer 88 and display terminal 90.

In order to implement the measurement and adaptive control just described, the memory is provided with a set of registers and buffers. As shown in FIG. 4, the memory includes a workpiece flow signal register 232 to store the last flow signal of the workpiece measurement. Similarly, a gauge register 234 stores the specified flow value. When the signals in the register 232 have stabilized, the final signal is stored in the workpiece signal register 232'. A transient limit register 236 stores a predetermined absolute flow value to establish a transient limit. A workpiece acceptance limits register 246 stores the absolute flow values which represents the upper and lower tolerances for the workpiece. The workpiece count buffer 238 stores the relative flow values for the last "n" workpieces which represents the last group. In the illustrative embodiment, "n" is equal to five. The last group register 242 stores the average value of the last group. The next to last group register 244 stores the average value of the next to last group. Registers 248 and 252 store the adaptive control upper limit and lower limit, respectively.

Figure 5A:
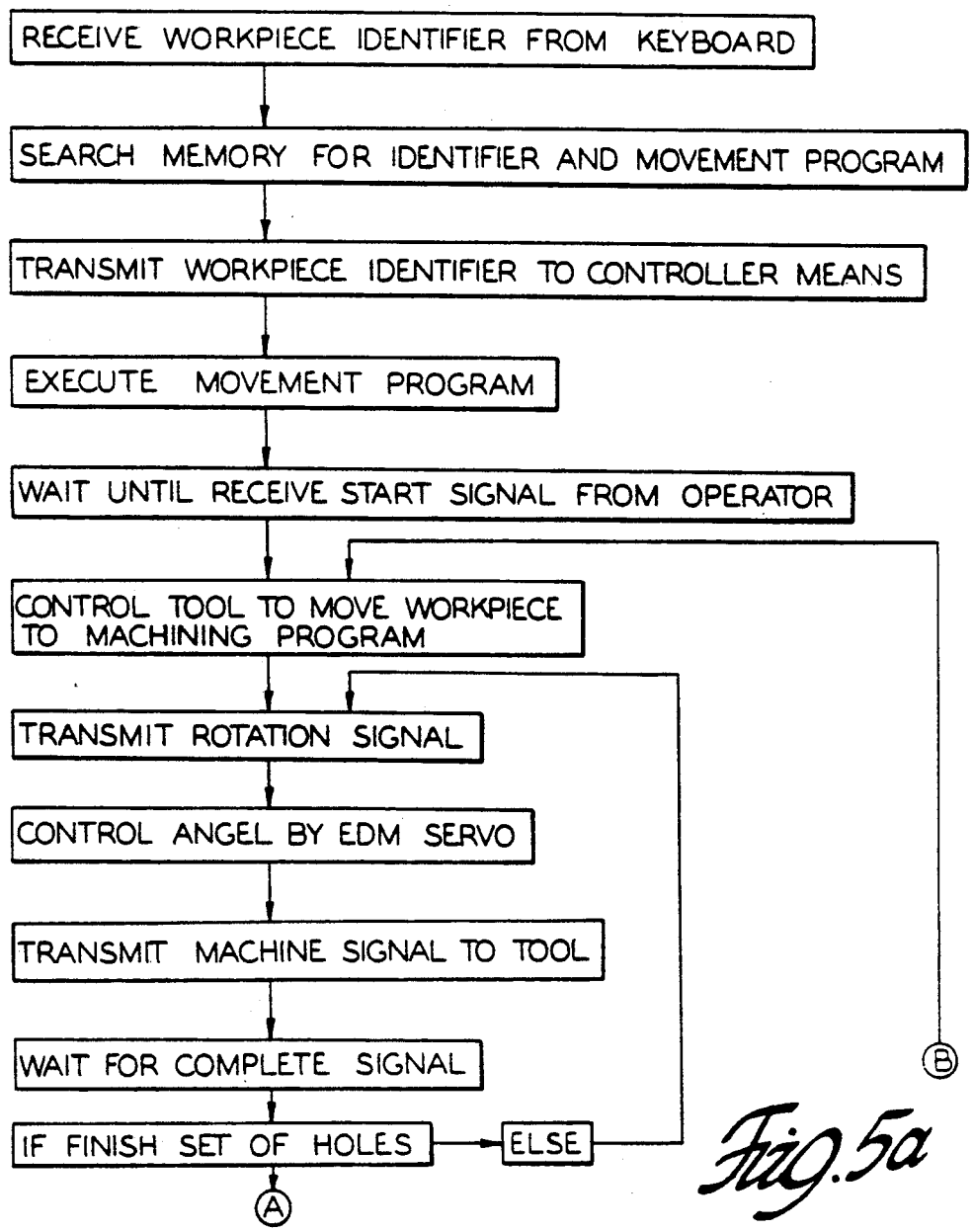
FIGS. 5a and 5b are a flow chart of the subject invention.
Figure 5B:
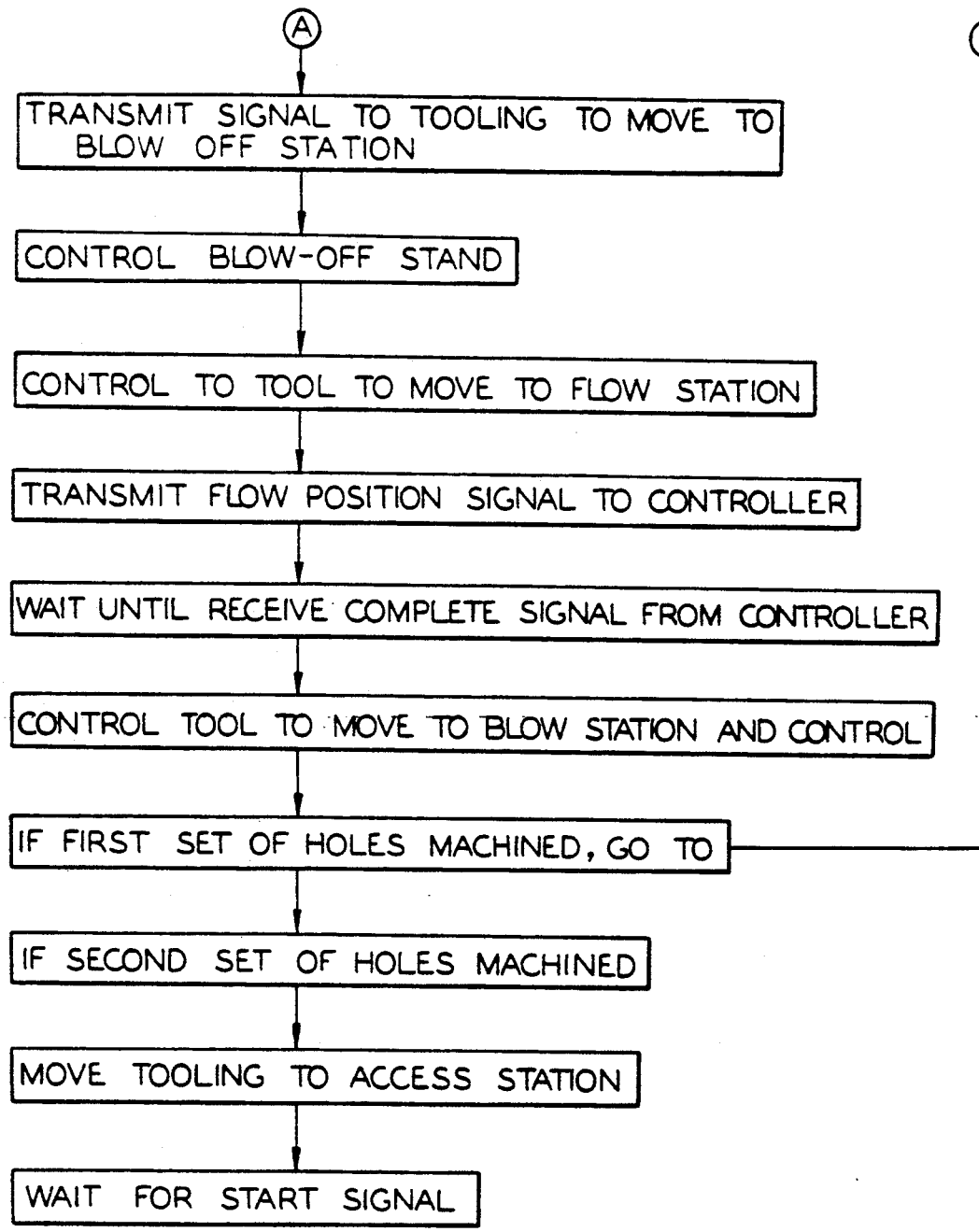
Figure 6A:
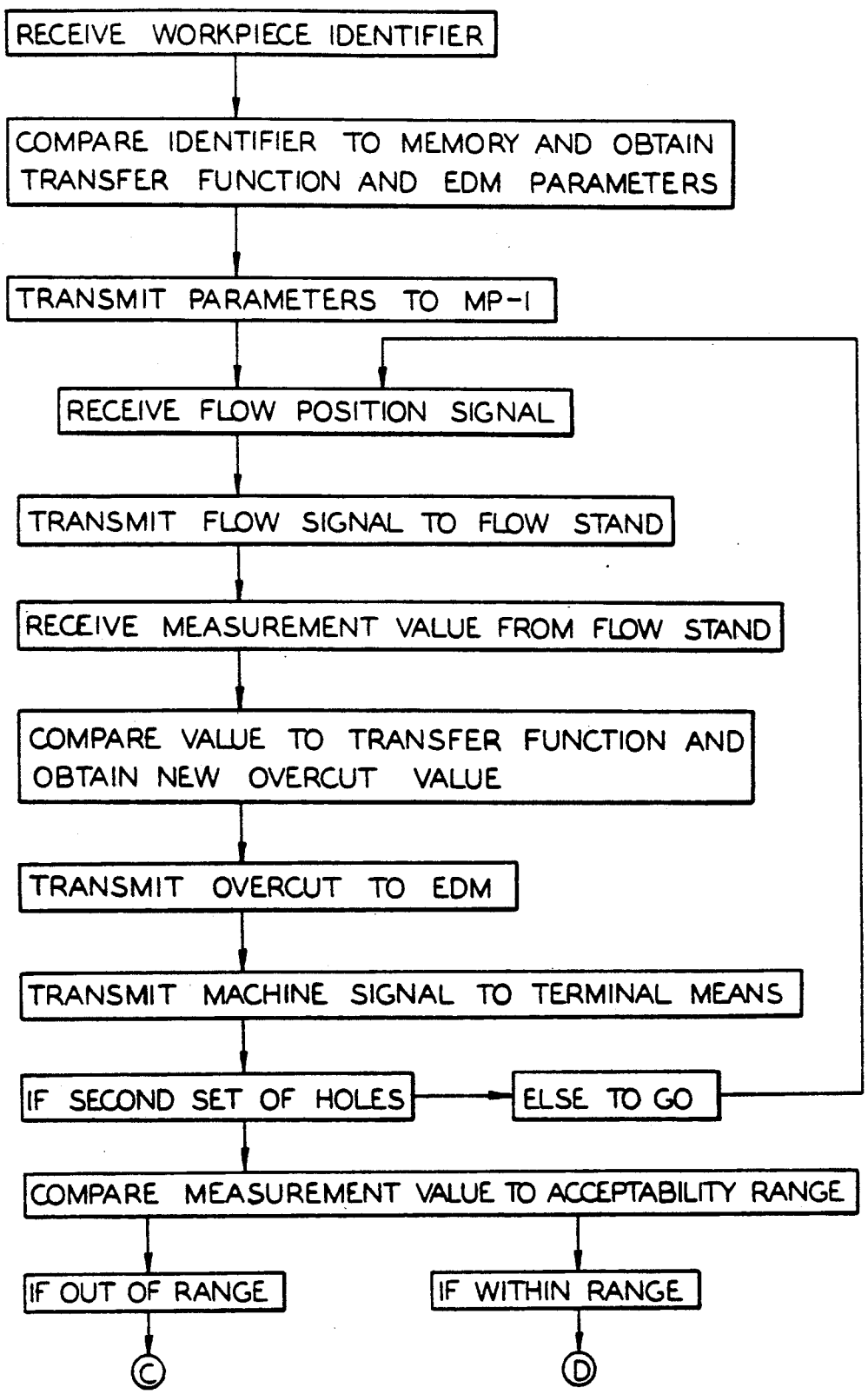
FIGS. 6a and 6b are a flow chart of the controller means.
Figure 6B:
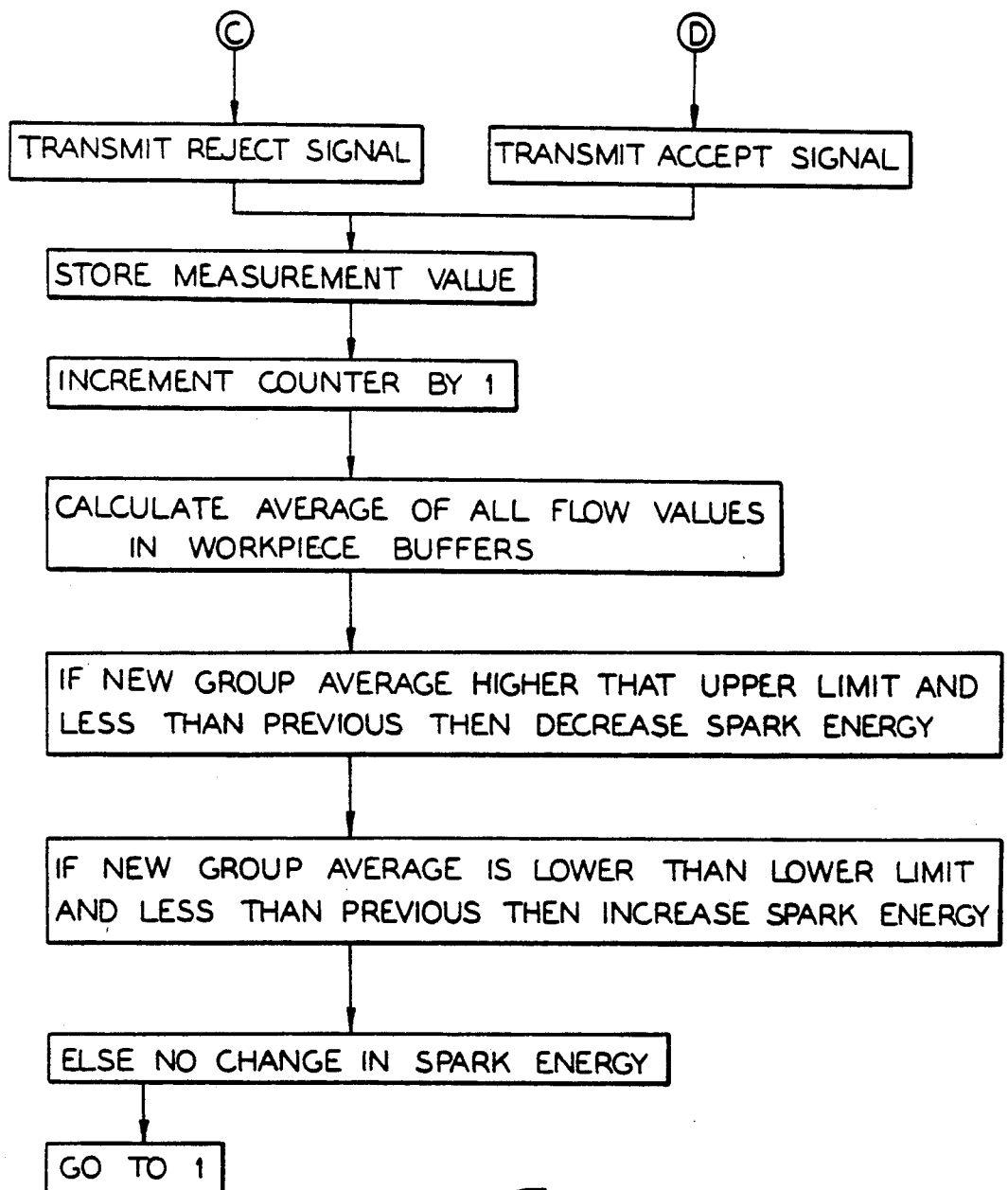

The flow chart for the terminal means 14 and the controller means 16 are generally indicated in FIGS. 5 and 6, respectively.

As indicated in FIG. 5, the controller means 16 is initiated by manual actuation of the keyboard which waits to receive a workpiece identifier. Upon reception of the workpiece identifier, the terminal means 14 searches its memory to obtain the movement program. At the same time, the terminal means 14 transmits the workpiece identifier to the controller means 16 and executes the program. The terminal means 14 then waits for depression of a start key producing a start signal from the operator to initiate machining. Upon reception of the signal, the servo controls 36, 38, 42, 44 transfer the workpiece from the accept station 18 to the offset station 29. The offset signal is received and the terminal means 14 compensates its movement program with the offset. The terminal means 14 then moves the spindle 28 to the machining station 22 and moves the EDM servo 56 to the proper angle orientation. The terminal means 14 transmits a machining signal to the machining means 30 Which drills the first hole by moving the servo 136. After machining, the machining means 30 transmits a complete signal to the terminal means 14, which in turn controls the tooling to rotate the workpiece to the next hole position, preferably to the every other hole position, and repositions the EDM servo 56. This will continue until all of the holes of the first portion are complete. The terminal means 14 will move and position the workpiece to the blow-off station 26 and operate the blow-off stand 62 and cylinder 60 for clamping thereto and therefrom after blowing-off. Next, the terminal means 14 will move the workpiece to the test station 24 and clamp the workpiece to the head 64. The terminal means 14 transmit a signal to the controller means 16 that the workpiece is ready for testing of the first set of holes. The terminal means 14 waits to receive a signal to move the workpiece back to the blow station 26, and then back to the machining station 22. The terminal means 14 will drill the remaining holes based on the adjustable parameter which is directly sent to the machining means 30 from the controller means 16. Upon finishing the drilling of the holes, the terminal means 14 receives a complete signal from the machining means 30. The terminal means 14 will move the workpiece from the machining station 22 to the blow off station 26 and operate the blowing-off, and then move the workpiece to the flow stand. The terminal means 14 transmits a signal indicating that workplace 10 is ready for testing of the combined first and second set of holes. The terminal means 14 waits to receive a complete signal and moves the workpiece to the access station 18. This flow chart is then repeated for each successive workpiece.

The flow chart for the controller means 16 is generally illustrated in FIG. 6. The controller means 16 waits for the workpiece identifier, and upon receipt of which compares the workpiece identifier to its memory to obtain the transfer function and the adjustable variable. Upon obtaining the first adjustable variable, the controller means 16 transmits the adjustable variables to the processor means 40 of the machining means 30. The controller means 16 waits for a signal indicating the workpiece is at the flow station 24 and that the first set of holes are drilled. The controller means 16 then transmits a start signal to the flow stand which initiates the flushing and measurement. Upon stabilization of the measuring signal, the controller means 16 receives measurement signal and compares the measurement signal to the transfer function in buffer 128 to obtain a new overcut value for the adjustable parameter. If the received measurement value is greater than the ideal transfer function characteristic, the overcut is decreased to drill a smaller hole, and vice versa. The overcut is transferred to the machining means 30, and the controller means 16 transmits a signal to the terminal means 14 indicating completion of testing and for movement of the tooling to the blow-off station 26 and to complete the machining of the workpiece. The controller means 16 waits for a second signal indicating in position for flowing from the terminal means 14, and that the second set of holes has been drilled. The controller means 16 will then transmit the flow signal to the flow stand to initiate measurement, and then receive the measurement signal from the flow stand. Upon reception of the combined measurement signal, the controller means 16 will first compare the measurement signal to the specified level and transmit either a reject signal if the measurement signal is outside of the acceptance limit or transmit an acceptance signal if the measurement signal is within the acceptance limit. Furthermore, the controller means 16 will store the combined measurement signal in memory. The flow chart will then be repeated. After a predetermined number of successive workpieces have been machined, such as five, the controller means 16 will analyze the trend of the stored combined measurement values and generate a starting adjustable variable for the first set of holes to be drilled for use by machining means 30. The process is repeated for each new workpiece.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described

What is claimed is:

1. A method of non-contact machining a workpiece to provide a plurality of features thereof with a specified combined size within predetermined tolerances, the machining being determined by plural parameters at least one of which is adjustable, the method comprising the steps of:
   machining a workpiece to form a first feature, the feature having a size which varies with an adjustable parameter,
   measuring the first feature on the workpiece to obtain a first measurement value which represents the size of the first feature,
   machining a second feature by adjusting the adjustable parameter to machine the second feature to an extrapolated size determined from the first measurement value so that the combined size of the first and second features is within a predetermined tolerance.

2. A method as set forth in claim 1 further characterized by measuring the combined first and second features on the workpiece to obtain a combined measurement value which represents the size of the combined first and second features.

3. A method as set forth in claim 2 further characterized by analyzing the combined measurement values of successive workpieces to determine the trend of change of the measured values with respect to the specified size.

4. A method as set forth in claim 3 further characterized by the feature being a hole in the workpiece.

5. A method as set forth in claim 4 further characterized by the machining being eroded by electrical discharge and the adjustable parameter being spark energy.

6. An assembly for non-contact machining to provide a plurality of features with a specified combined size in a workpiece, said assembly comprising:
   machining means (30) for machining first and second features on a workpiece, the features having a size which varies with an adjustable parameter;
   measuring means (20) for measuring the size of the first feature and the combined size of the first and second features on the workpiece and producing a first measurement signal and combined measurement signal, respectively; and controller means (16) for receiving and analyzing the first measurement signal and for producing the adjustable parameter for machining the second feature by analyzing the first measurement signal to determine an extrapolated size of the second feature necessary to be machined so that the combined size of the first and second features is within a predetermined tolerance.

7. An assembly as set forth in claim 6 further characterized by terminal means (14) for moving the workpiece between said machining means (30) and said measuring means (20) in response to said controller means (16).

8. An assembly as set forth in claim 7 further characterized by including blow means (26) for receiving and air blowing said workpiece for removing residue thereon.

9. An assembly as set forth in claim 8 further characterized by said controller means (16) including trend feedback means (134) for computing for successive groups of combined features an average of said combined measurement values within each group and determining the trend of change among successive groups in the order in which the groups were machined and adjusting the adjustable parameter in a sense which tends to cause succeeding features to be machined to said specified size.

10. An assembly as set forth in claim 9 further characterized by said terminal means (14) including input means (110) for receiving manual input of a workpiece identifier.

11. An assembly as set forth in claim 10 further characterized by said terminal means (14) including memory means (114) for storing a plurality of numbers associated with a plurality of workpiece identifiers and associated workpiece movement programs for moving the workpiece.

12. An assembly as set forth in claim 11 further characterized by said terminal means (14) including processor means (112) for receiving and comparing said workpiece identifier to said number in said memory means (114) to obtain a movement program for an identified workpiece.

13. An assembly as set forth in claim 12 further characterized by said measuring means (20) providing an absolute flow measurement value representative of the rate of flow through said workpiece.

14. An assembly as set forth in claim 13 further characterized by said machining means (30) including an electric discharge machine of the type including an electrode adapted to be connected in circuit with the workpiece to erode the workpiece by an intermittent electrical discharge across the gap between the electrode and the workpiece, the effectiveness of said intermittent discharge in eroding said workpiece being determined by plural parameters at least one of which is adjustable.

15. An assembly as set forth in claim 14 further characterized by said electrode being a wire electrode and said feature is a hole in the workpiece.

16. An assembly as set forth in claim 15 wherein said adjustable parameter is spark energy.

17. An assembly as set forth in claim 13 further characterized by said machining means (30) including a laser.

* * * * *